(12) United States Patent
Ito et al.

(10) Patent No.: US 8,806,146 B2
(45) Date of Patent: Aug. 12, 2014

(54) METHOD AND SYSTEM TO ACCELERATE ADDRESS TRANSLATION

(75) Inventors: Megumi Ito, Yamato (JP); Takeshi Ogasawara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 12/970,046

(22) Filed: Dec. 16, 2010

(65) Prior Publication Data

US 2011/0145541 A1 Jun. 16, 2011

(30) Foreign Application Priority Data

Dec. 16, 2009 (JP) .................................. 2009-285375

(51) Int. Cl.
*G06F 12/00* (2006.01)

(52) U.S. Cl.
USPC ............................ 711/145; 711/170; 711/203

(58) Field of Classification Search
USPC ........................................ 711/203, 145, 170
See application file for complete search history.

(56) References Cited

U.S. PATENT DOCUMENTS

| 7,475,183 B2 * | 1/2009 | Traut et al. ......................... 711/6 |
| 2004/0064668 A1 * | 4/2004 | Kjos et al. ...................... 711/202 |

* cited by examiner

*Primary Examiner* — Kalpit Parikh
(74) *Attorney, Agent, or Firm* — Jennifer R. Davis; Anne Vachon Dougherty (57) ABSTRACT

In a method to accelerate address translation into a physical address, a computer maps a virtual memory area with a large page, the virtual memory area including multiple virtual pages satisfying a predetermined condition and being handled in units of pages, the large page having a larger area than each of the virtual pages, and under a condition in which one of the virtual pages mapped with and included in the large page has a memory protection attribute different from a memory protection attribute of the other virtual page, sets physical memory protection information for protecting a physical page corresponding to the one virtual page having the different memory protection attribute.

8 Claims, 6 Drawing Sheets

METHOD AND SYSTEM TO ACCELERATE ADDRESS TRANSLATION

BACKGROUND OF THE INVENTION

The present invention relates to a method and a system to accelerate address translation from a virtual address into a physical address.

In recent years, to reduce the cost of server management, virtualization techniques are actively used to integrate multiple existing servers into a single new server. When the architectures of an existing server and a new server differ from each other, the new server (also referred to as a "host" below) uses an emulator which emulates the architecture of the existing server to run the existing server (also referred to as a "guest" below) on the host. An emulator is software which enables to run a guest system on a host by emulating the architecture of the guest system. By using an emulator, guest functions can be integrated onto a host which architecture is different from the guest without recompiling the guest application.

The emulator uses a shadow page table to access data in the guest on the host based on a guest virtual address. The shadow page table manages a mapping of a guest virtual address to a host physical address, for example, by page units. Here, assume that a page unit is 4 KB. A host CPU (central processing unit) uses the shadow page table to perform automatic address translation by hardware. Most CPUs have hardware TLBs (translation lookaside buffers) to cache the results of address translation. When a virtual address hits on the hardware TLB, the address can be translated without expensive translation using the shadow page table.

Meanwhile, an increased memory usage in recent applications has brought about a performance degradation problem due to hardware TLB misses. The capacity of the hardware TLB is limited because of the hardware cost, so the hardware TLB can cache only a small range of virtual addresses with the 4 KB page units. In order to improve the hardware TLB hit rate, the emulator considers use of a large page, with which a larger virtual memory area can be collectively mapped transparently to the guest (without any change on the guest). If a page unit is 4 KB (this page unit is also called a normal page), for example, a large page refers to a page which is larger than the normal page unit, and has a size of 1 MB, for example. However, a certain continuous virtual memory area in the guest cannot be simply mapped with a large page. This is because a guest OS (operating system) basically manages and protects its memory in normal page units.

Another case where a virtual memory area cannot be mapped with a large page is where normal pages in the large page have different memory protection attributes. A typical example is a case where pages having different memory protection attributes such as a readable and writable page and a read-only page exist on a single large page area. Another example is a case where a normal page mapped to a physical memory area and a normal page not mapped to a physical memory area exist on the same large page area. However, even in these cases, if the virtual memory area can be replaced with a large page, performance can be improved by reduced hardware TLB misses.

As a known method for reducing hardware TLB misses by use of a large page, there is a method (see "Practical, transparent operating system support for superpages" J. Navarro et al, OSDI, 2002, for example) in which an OS collectively promotes 4 KB pages having the same page attribute to a large page transparently to the application, and demotes the large page to the 4 KB pages when the attribute of any of the pages is changed. However, this method cannot detect nor forbidden an unauthorized read access or write access to a virtual memory area.

Additionally, there is a translation lookaside buffer (see Japanese Patent Application Publication No. Hei 8-101797, for example) as a TLB for translating a virtual address into a physical address for a virtual page having a variable page size, for example. The translation lookaside buffer described in Japanese Patent Application Publication No. Hei 8-101797 can reduce TLB misses by use of a victim cache, but does not deal with a case where there are multiple memory protection attributes.

Moreover, there is a remapping apparatus (see Japanese Patent Application Publication No. Hei 8-36528, for example) in which a virtual address is firstly translated into an intermediate address, and then the intermediate address is translated into a physical address, so that multiple discontinuous physical pages can be mapped to a larger virtual large page. However, the remapping apparatus disclosed in Japanese Patent Application Publication No. Hei 8-36528 requires a remapping lookaside buffer (RLB) in addition to a translation lookaside buffer (TLB) to perform address translation using an intermediate address. Hence, the cost for address translation is doubled, and system performance is degraded.

Furthermore, there is a program loading method (see Japanese Patent Application Publication No. 2006-260395, for example) used for loading a program to a virtual address space in which the page size of at least one area differs from the page size of another area. In this method, the frequency of TLB misses is lowered by assigning a text or the like of a program either to an area having the smallest page size among areas having a larger page size than the size of the text or the like of the program, or to an area having the largest page size among areas having a smaller page size than the size of the text or the like. However, in the program loading method described in Japanese Patent Application Publication No. 2006-260395, the page size is determined when loading the program, and thus the page size cannot be determined appropriately when a mapping from a virtual address to a physical address dynamically changes.

SUMMARY OF THE INVENTION

The present invention aims to provide a method and a system for accelerating address translation from a virtual address into a physical address. This is achieved by mapping (replacing) a virtual memory area with a large page according to the usage of the virtual memory, and individually processing physical pages corresponding to virtual pages that need to be handled individually in the virtual memory area mapped with the large page.

In an aspect of the present invention, a first embodiment of the present invention is provided as a method for accelerating address translation from a virtual address into a physical address by use of a computer. When finding a virtual page of a page unit that needs to be newly mapped, the computer determines whether or not the virtual page satisfies a predetermined condition, and maps with a large page a virtual memory area including a plurality of virtual pages satisfying the predetermined condition and being handled in units of pages, the large page having a larger area than each of the virtual pages. In addition, under a condition in which one of the virtual pages mapped with and included in the large page has a memory protection attribute different from a memory protection attribute of the other virtual page, setting physical memory protection information for protecting a physical page corresponding to the one virtual page having the different memory protection attribute.

According to a second mode of the present invention, besides the first mode, the predetermined condition is that any of physical pages respectively corresponding to the plurality of virtual pages to be mapped with the large page does not correspond to any other virtual page. In addition, in a case where the other virtual page corresponding to the physical page is mapped with the large page, the large page is changed back to the virtual page in the unit of page.

According to a third mode of the present invention, besides the first mode, the predetermined condition is that a ratio of virtual pages each having no corresponding physical page with respect to the plurality of virtual pages to be mapped with the large page is lower than a certain value. The predetermined condition is that the virtual pages are determined to be mapped with a large page based on the usage histories of large pages.

According to a fourth mode of the present invention, besides the first mode, the computer stores an application executable on another computer and an emulator of the application.

Another aspect of the present invention provides a system that executes the steps of the above method.

The present invention provides a method and a system in which a computer maps a virtual memory area with a large page, the virtual memory area including a plurality of virtual pages satisfying a predetermined condition and being handled in units of pages, the large page having a larger area than each of the virtual pages, and under a condition in which one of the virtual pages mapped with and included in the large page has a memory protection attribute different from a memory protection attribute of the other virtual page, sets physical memory protection information for protecting a physical page corresponding to the one virtual page having the different memory protection attribute. As a result, the virtual memory area is mapped with a large page according to usage of the virtual memory, and physical pages corresponding to virtual pages that need to be handled individually in the virtual memory area mapped with the large page are processed individually. Hence, address translation from a virtual address into a physical address can be accelerated.

DETAILED DESCRIPTION OF THE PREFERRED EMBODIMENT

Hereinbelow, an embodiment of the present invention will be described with reference to the drawings. Note that this is a mere example, and the technical scope of the invention is not limited to the embodiment.

Figure 1:
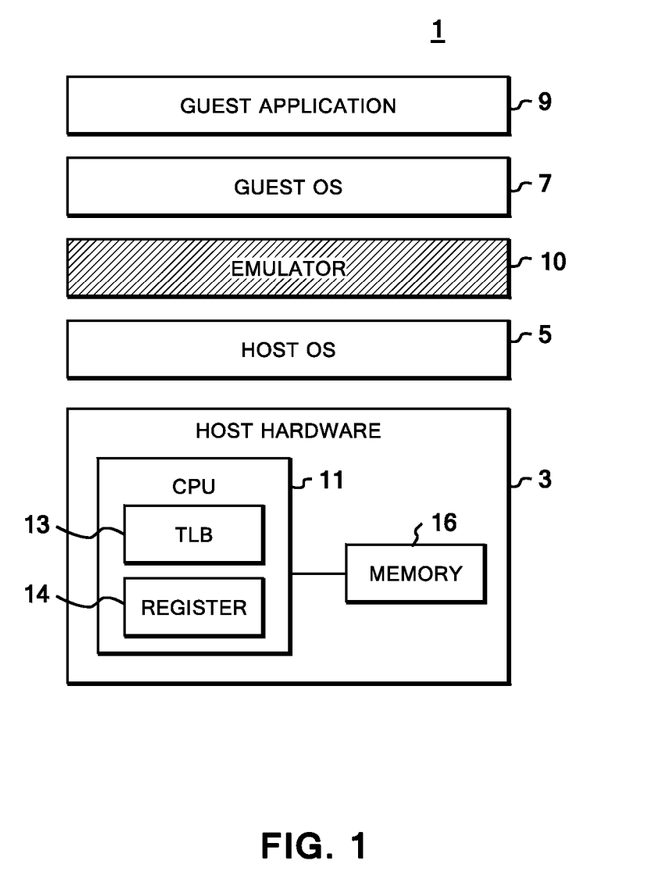
FIG. 1 is a diagram showing a software configuration of a host according to the present embodiment.

As an example using the invention, a description will be given of a case of using a large page when a guest is emulated on a host. FIG. 1 is a software configuration of a host 1 according to the embodiment.

The host 1 shown in FIG. 1 is configured of host hardware 10, a host OS 3 that runs on the host hardware 10, an emulator 5, a guest OS 7, and software of a guest application 9. Once the host OS 3 runs on the host hardware 10 and the host OS 3 executes the emulator 5, the host OS 3 can execute the guest application 9 that runs on the guest OS 7.

The host 1 is a server typified by IBM System z (registered trademark), for example. Assume that in the host 1, the size of a normal page is 4 KB, and the size of a large page is 1 MB. Meanwhile, the guest that runs on the host 1 is an Intel (registered trademark) server, for example. The guest is assumed to use a normal page of the size 4 KB, and a large page of the size 4 MB.

The host hardware 10 includes a CPU 11 and a memory 16. The CPU 11 performs computation and processing of information, and is a central processor that has overall control of the host 1. The CPU 11 includes a TLB 13 and a register 14. The TLB 13 is a hardware TLB which caches a result of translation from a virtual address into a physical address, and which is a buffer that returns a physical address corresponding to a virtual address existing in the TLB 13. The register 14 will be described later. The memory 16 is a semiconductor storage device that includes a RAM (random access memory), a ROM (read only memory), and the like, for example.

Note that a computer in this invention refers to an information processor including a controller, a storage, and the like. The host 1 is an information processor including the CPU 11, the memory 16, and the like, and is included in the concept of a computer in this invention.

Figure 2:
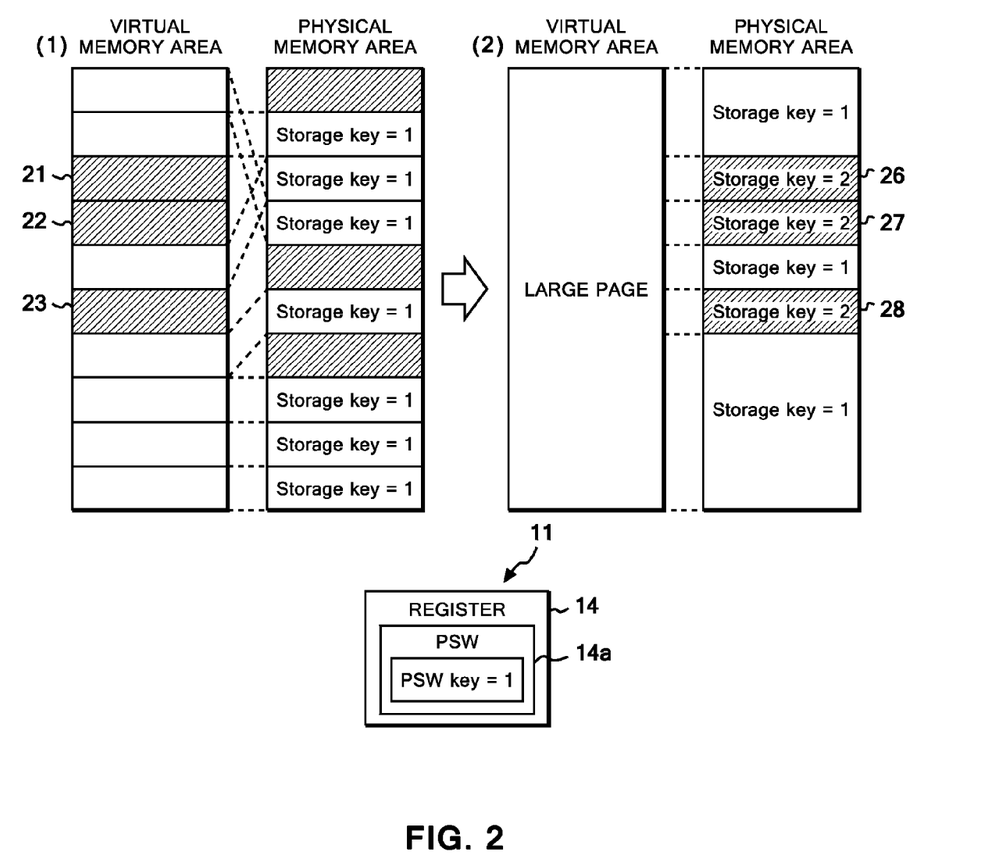
FIG. 2 is a diagram showing a state where an existing mapping of a virtual memory area is replaced with a large page according to the present embodiment.

Next, a description will be given of how a virtual address in the guest application 9 that runs on the host 1 is replaced with a physical address in the host 1 by the guest OS 7 and the emulator 5. FIG. 2 is a diagram showing a state in which an existing mapping of a virtual memory area is replaced with a mapping with a large page according to this embodiment. Here, for simple explanation, a large page is of a size equal to the size of ten normal pages.

In part (1) of FIG. 2, as an existing mapping, some of virtual pages are mapped to physical pages by using the size of a normal page. In part (1) of FIG. 2, seven out of ten virtual pages are mapped to the physical pages. Virtual pages 21 to 23 in the virtual memory area are not mapped to any physical page.

In part (2) of FIG. 2, the virtual memory area shown in part (1) of FIG. 2 in which some of the virtual pages are mapped by use of normal pages is replaced with a mapping by use of a large page. The entire virtual memory area in the size of the large page is mapped to the continuous physical memory area.

With this replacement, by mapping the entire virtual memory area of the large page size to the continuous physical memory area, the virtual pages that originally had no mapping (the virtual pages 21 to 23 of part (1) of FIG. 2) are also mapped to physical pages. Accordingly, to protect the virtual pages that originally had no mapping, physical memory protection information called a storage key is used. The storage key is a memory management function used in IBM System z. With the storage key, reading and writing from and to the memory can be restricted for each physical page of 4 KB. Note that among the memory protection attribute set by a virtual page and that set by a storage key, the attribute that sets a larger limitation is prioritized. For example, when the attribute of a virtual page is read-only, the virtual page is accessed as read-only even if the attribute of a corresponding physical page is set to read/write by a storage key.

A storage key is associated to each physical page of 4 KB, and is a bit string made of seven bits defined by the architecture. Of the seven bits, four bits represent access control bits (ACC), and a bit represents a fetch protection bit (F). The ACC bit and the F bit are used for memory access control. Meanwhile, the register 14 of the CPU 11 includes a global register PSW 14a (PSW: program status word), and a PSW key of four bits is included therein. The ACC bit is used for controlling write access to a corresponding physical page, whereas the F bit is used for controlling read access to a corresponding physical page.

Here, a method for prohibiting memory access by use of a storage key will be described. After the guest application 9 is started up and a physical page is to be accessed by an address translated by use of the shadow page table, the CPU 11 firstly checks the PSW key against an ACC bit of the physical page to be accessed. If the PSW key and the ACC bit coincide with each other, the CPU 11 allows access. In contrast, consider a case where the PSW key and the ACC bit do not coincide with each other. In this case, if the ACC bit indicates that the access is a write access, the CPU 11 prohibits the access. Meanwhile, if the ACC bit indicates that the access is a read access, the CPU 11 then checks the F bit. If the F bit is set to "1," the CPU 11 prohibits the access to read from the memory. When prohibiting access, the CPU 11 causes a hardware interrupt. In the example in part (1) of FIG. 2, the guest application 9 is able to access all of the virtual pages which are mapped to the physical pages, and thus the PSW key and the storage key are the same.

To protect the virtual pages 21 to 23 that had no mapping in the existing mapping, as shown in part (2) of FIG. 2, a special storage key is set for each of the physical pages to which a corresponding one of the virtual pages 21 to 23 is mapped so that reading and writing from and to the physical page may be prohibited. A special storage key is, for example, a setting having a particular ACC bit and an F bit set to "1." This setting allows the use of the large page while the mapped or not mapped state in the existing mapping is maintained. Storage keys different from a normal storage key are set for physical pages 26 to 28. This setting brings about the effect of using the large table for access to virtual pages that were mapped to the physical pages in the existing mapping, and prohibits access to virtual pages that had no mapping in the existing mapping due to inconsistency between the storage key and the PSW key.

Figure 3:
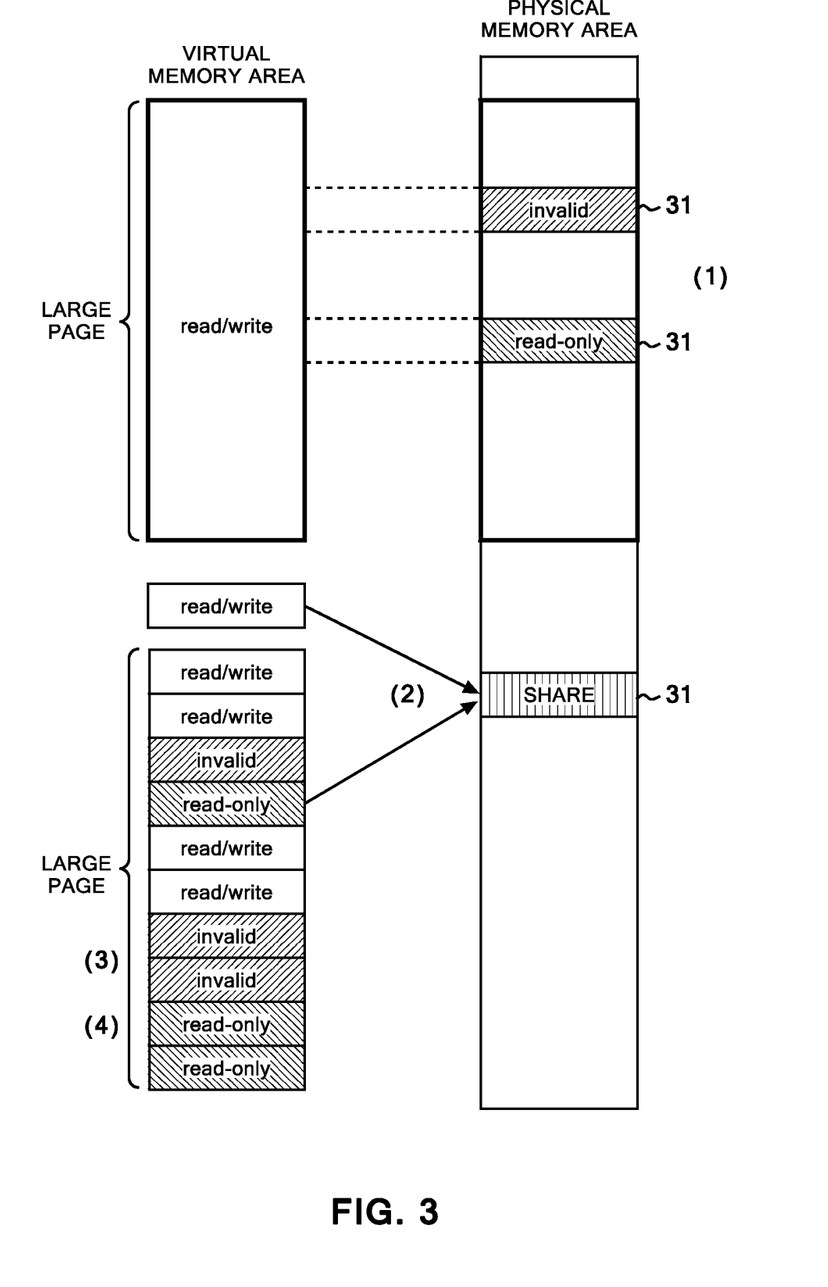
FIG. 3 is a diagram showing examples in which a mapping to a large page is applied and in which the mapping is not applied, according to the present embodiment.

FIG. 3 is a diagram showing examples in which a mapping by use of a large page is applied and in which the mapping is not applied, according to the embodiment. Part (1) of FIG. 3 is an example in which a virtual memory area is mapped by use of a large page even when the virtual memory area includes virtual pages having different memory protection attributes. Although most of the memory protection attributes of the area to be mapped with the large page are read/write, some areas have memory protection attributes of invalid, and read-only. In this case, the virtual memory area to be mapped with the large page is set to have the memory protection attribute of read/write having the lowest protection level, and the invalid and read-only physical pages are protected by setting a corresponding storage key in each of the physical pages.

For example, for an invalid physical page 31, a particular ACC bit and an F bit set to "1" are set in a storage key for prohibiting reading and writing from and to the physical page 31. Meanwhile, for a physical page 32 whose memory protection attribute is read-only, a particular ACC bit and an F bit set to "0" are set in a storage key for allowing only reading from the physical page 32. It should be noted that for a physical page whose memory protection attribute is read/write, the normal ACC bit and the F bit set to "0" are set in a storage key for allowing both reading and writing from and to the physical page.

Conventionally, the entire virtual memory area in a large page area needed to have the same memory protection attribute to map the virtual memory area with the large page, and thus it was impossible to map, with a large page, a virtual memory area having different memory protection attributes as in the example in part (1) of FIG. 3. However, this invention allows a mapping of such a virtual memory area with a large page having a larger size than a normal page, thereby allowing reduction in TLB misses.

Part (2) of FIG. 3 shows a case in which the memory protection attribute differs between virtual pages that share a physical page 33. In this case, since protection of the physical page is difficult, a mapping by use of a large page is avoided and a mapping is applied by use of a normal page.

Part (3) of FIG. 3 shows how unused physical pages in a memory area that is already mapped with a large page are managed so that the mapping with a large page can be cancelled when the number of unused physical pages increases. In this case, a counter of virtual pages mapped in the large page is compared with a threshold, so that it is determined whether or not to cancel the mapping.

Part (4) of FIG. 3 shows how virtual memory areas which are likely to be mapped with a large page in the future are mapped with a large page at an early stage. Mapping these virtual memory areas with a large page in advance allows elimination of the cost of mapping with normal pages. In this case, the virtual memory areas can be mapped in advance by analyzing the tendency of memory usage by use of a record of a large page mapping. Past usage of virtual memory areas are accumulated in the record of the large page mapping.

Figure 4:
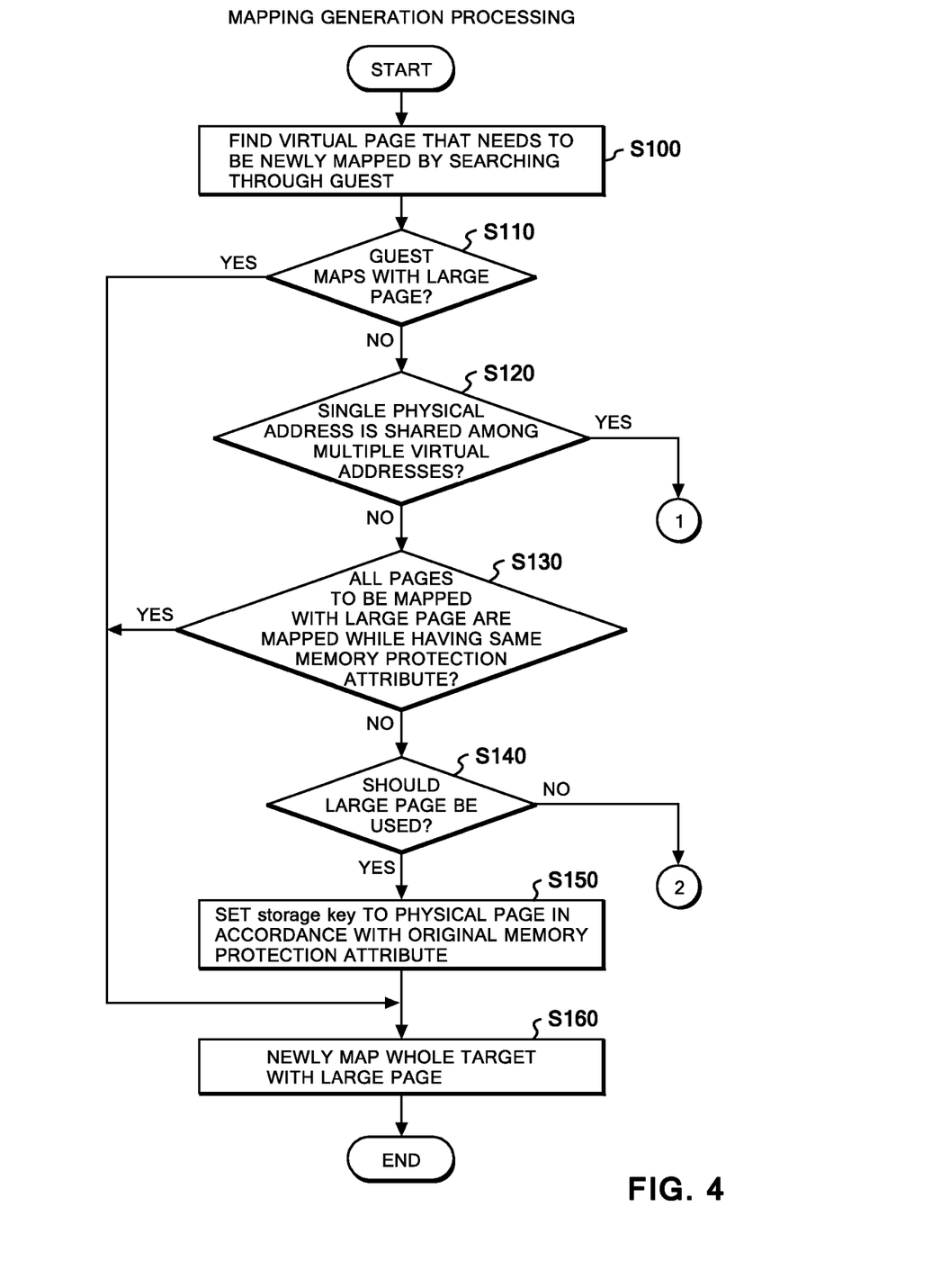
FIG. 4 is a flowchart showing a flow of generating a new mapping according to the present embodiment.
Figure 5:
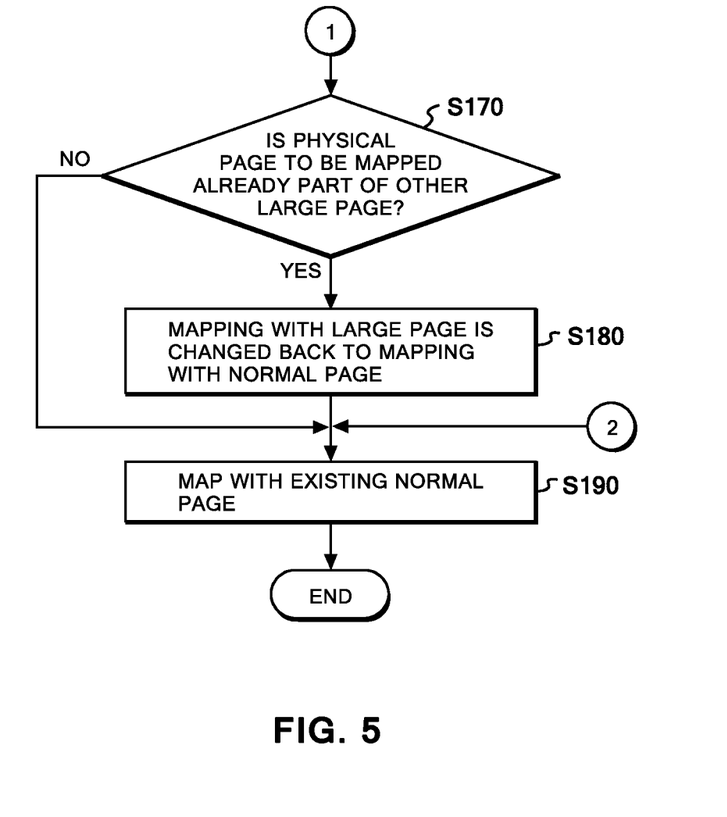
FIG. 5 is a flowchart following the one in FIG. 4.

Next, a description will be given of flowcharts for generating the mapping described with reference to FIGS. 2 and 3. FIGS. 4 and 5 are flowcharts showing a flow of generating a new mapping according to the present embodiment. Here, described is a procedure in which the CPU 11 newly generates a mapping of a guest virtual page to a physical page of the host 1.

Firstly, in step S100 (hereinbelow, step S is simply denoted as S), a virtual page that needs to be newly mapped is found by searching through the guest. As an exemplary method to find this virtual page that needs to be newly mapped, there is a method in which a write protect is set on the page table of the guest so that it is found that the guest OS 7 writes to the page table. There is another method in which the guest OS 7 is caused to actually access the address to find that the virtual page needs to be mapped because there is no entry in the page table.

In S110, it is determined whether or not the guest has already mapped the virtual page with a large page. This can be determined by use of the page table of the guest OS 7. If the mapping with a large page is already applied by a conventional technique (S110: YES), the processing proceeds to S160, and the virtual page is mapped with a large page even in the shadow page table. In contrast, if the mapping with a large page is not applied (S110: NO), the processing proceeds to S120.

In S120, it is determined whether or not a single candidate physical page is shared by multiple virtual pages. If the physical page is shared (S120: YES), the mapping with a large page is given up, and the processing proceeds to S170 of FIG. 5. In contrast, if the physical page is not shared (S120: NO), the processing proceeds to S130.

Whether or not a candidate physical page is shared by multiple virtual pages can be determined by checking the number of times of mapping, for example. As a conceivable exemplary method to check the number of times of mapping, a corresponding bit of a bit vector may be checked. Each bit represents the mapped state of a corresponding physical page, and is set at the time of the first mapping. A corresponding bit is checked, and if the bit is set, it is determined that multiple virtual pages are mapped to the physical page. Alternatively, the number of times of mapping may be managed by use of a counter.

In S130, it is determined whether or not all of virtual pages in the virtual memory area to be mapped with the large page have the same memory protection attribute, and all of the virtual pages other than the virtual pages to be mapped are mapped. If this condition is satisfied (S130: YES), the processing proceeds to S160, and the entire virtual memory area including the target virtual pages is mapped with a large page. This is a conventional method called super page. In contrast, if the condition is not satisfied (S130: NO), the processing proceeds to S140.

In S140, the rate of unused physical pages and a usage history of the virtual memory area to be mapped with a large page are checked. Then, it is determined whether or not to map the virtual page with a large page based on the unused physical pages and the usage history. If it is determined that the large page should be used (S140: YES), the processing proceeds to S150. In contrast, if it is determined that the large page should not be used (S140: NO), the processing proceeds to S190 of FIG. 5.

The determination on whether or not to use the large page is made by checking, as the rate of unused physical pages, how many virtual pages that have no mapping the virtual memory area to be mapped with a large page has. If there are few virtual pages that have no mapping, the virtual memory area is mapped with a large page. A threshold for the rate of unused physical pages may be given at the time of starting up the emulator 5, or may be determined according to the amount of free space in the memory of the entire system, for example. If there is enough free space in the memory of the entire system, a large page may be used even if there are many virtual pages that have no mapping. If there is not enough free space in the memory, the large page may be used only if there are few virtual pages that have no mapping.

Alternatively, whether or not to use a large page may be determined by use of a usage history. If a large page is frequently applied to a virtual memory area of a certain guest, it is highly probable that a current target for a large-page mapping would also be applied a large page even if it includes many virtual pages that have no mapping. Hence, the virtual memory area is mapped with a large page. In this respect, since the emulator 5 virtualizes the guest OS 7 and follows operations of the guest OS 7 such as switching of applications and the like, the emulator 5 is capable of distinguishing one guest application 9 from another, and can hold a large-page usage record for each guest application 9.

In S150, storage keys are set to the physical pages in accordance with the original memory protection attributes.

In S160, the entire target virtual memory area is newly mapped with a large page. Then, the processing is terminated.

In S170 of FIG. 5, it is determined whether or not the physical page to be mapped is already mapped with and is a part of a large page. This determination can be made by use of a bit vector and a hash, for example, according to a method of managing whether or not a physical page is mapped with a large page. Here, every time a mapping with a large page is applied, a bit corresponding to the initial address of the physical page is set, and a pair of this address and a page table entry is registered to the hash. To check whether or not a physical page is already mapped, an address aligned to a large page including the physical page to be mapped is computed from the physical page to be mapped, and a corresponding bit of the bit vector is checked. If the corresponding bit of the bit vector is not set, it is determined that the physical page is not mapped with a large page. If the physical page is already mapped with and is a part of another large page (S170: YES), the processing proceeds to S180. In contrast, if the physical page is not mapped with and is not a part of another large page (S170: NO), the processing proceeds to S190.

In S180, the physical page mapped with the large page is remapped with normal pages.

In S190, the virtual page is mapped with a normal page (4 KB). Then, the processing is terminated.

It should be noted that the CPU 11 uses the shadow page table mapped in S160 and S190 to update the TLB 13 included in the CPU 11.

According to the flowchart described with reference to FIGS. 4 and 5, the physical page to be mapped with a large page is mapped only with this large page. This is because it is considered that multiple virtual pages are rarely mapped to a certain physical page in a virtual memory space of each guest application 9. Sometimes, virtual memory spaces of different applications are mapped to a physical page including a shared library code. However, a virtual memory area including such a page is not mapped with a large page. As an exemplary countermeasure, the physical page including the code may be duplicated so that the virtual space of each application can be solely mapped to the physical page. In this case, use efficiency of an instruction cache is not affected during execution of each application. In addition, the applications are not frequently switched, and thus the influence of refetching a code from the instruction cache at every switching operation is almost none. As a result, the duplication hardly influences the instruction cache.

Thus, even when the guest OS only carries out a mapping by use of normal pages and pages having different memory protection attributes in the virtual address space appear alternately, the emulator 5 automatically maps the virtual memory area with a large page. Accordingly, hardware TLB misses can be reduced transparently to the guest OS 7. For example, in the case of IBM System z, by replacing an existing mapping with a large page, translation of an address of a virtual memory area which conventionally required 256 entries in the hardware TLB can be performed by a single entry in the hardware TLB. Consequently, pressure on the hardware TLB is lowered, hardware TLB misses are reduced, and the overall performance of the emulator 5 can be improved.

Figure 6:
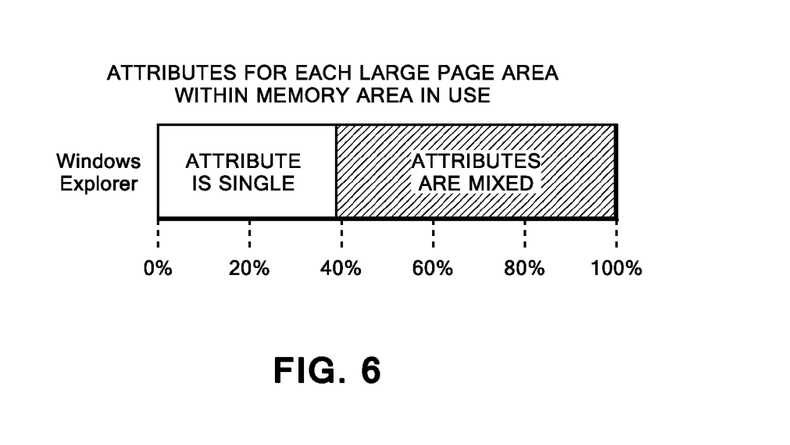
FIG. 6 is a diagram showing a memory status of Windows (registered trademark) Explorer to which the present embodiment is applied.

FIG. 6 is a diagram showing a memory status of Windows (registered trademark) Explorer in a case where the present embodiment is applied. In the example of Windows Explorer in FIG. 6, conventionally, a large page was applicable only to a memory area having a single attribute, and thus a large page could be used for little less than 40% of the memory area. However, by use of the method of this invention, a large page is also applicable even when the memory area has mixed attributes exists therein. Hence, a large page is applicable to most of the memory area, whereby hardware TLB misses can be reduced and the overall performance of the emulator 5 can be improved.

Hereinabove, a description has been given for use of a large page in the case of emulating an Intel server on IBM System z. However, the invention is not limited to this, and is essentially applicable to any system that makes use of a shadow page table as long as the hardware has a function, similar to the storage key, by which access can be restricted for normal page units within a virtual memory area defined as a large page. For example, by applying the invention to an OS, the original performance of the OS itself can be improved. As for other systems, reduction of TLB misses due to replacement with a large page can expectantly improve the performance of the system as a whole.

Figure 7:
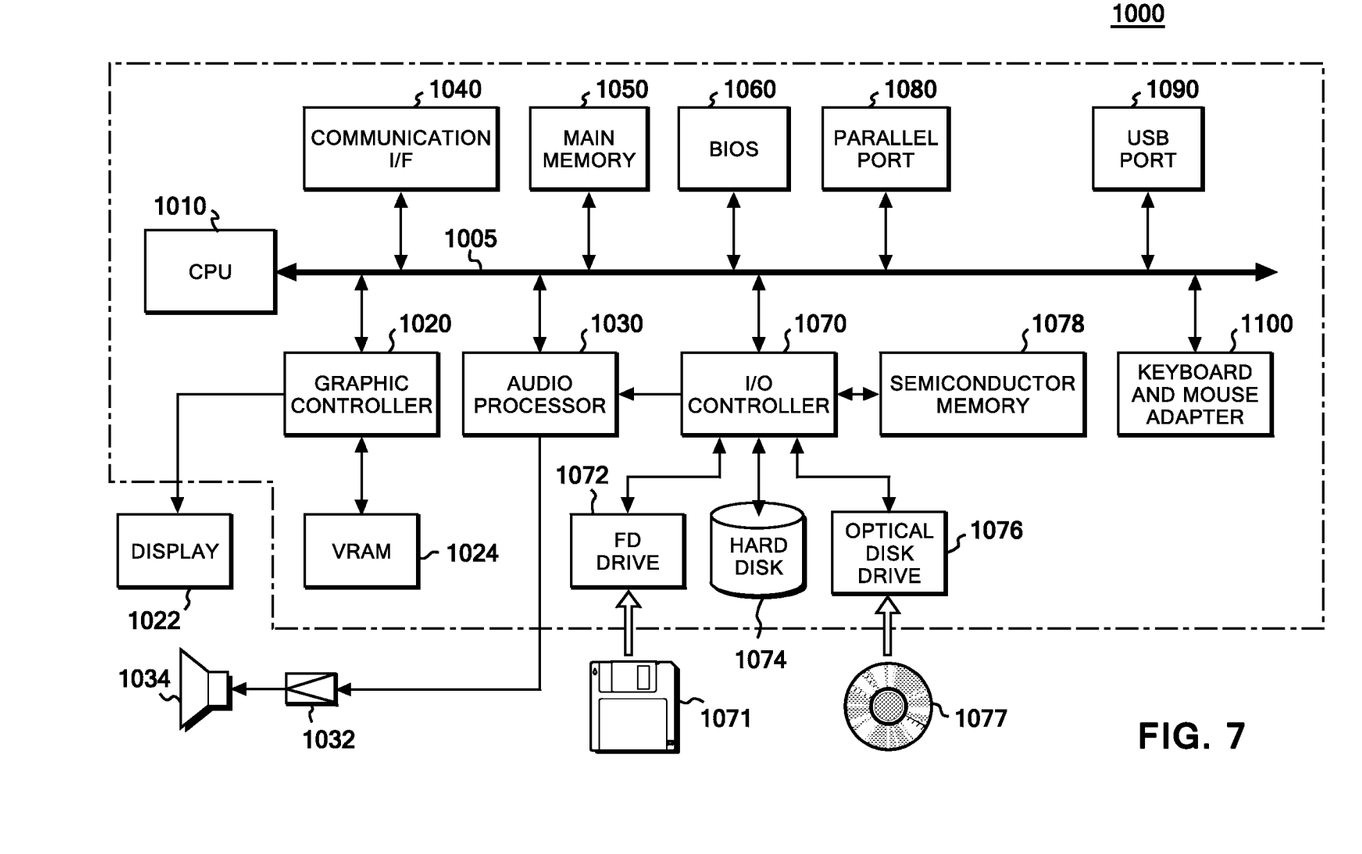
FIG. 7 is a diagram showing a hardware configuration of the host according to the present embodiment.

Finally, a hardware configuration will be described. FIG. 7 is a diagram showing a hardware configuration of the host 1 according to the embodiment. In FIG. 7, the host 1 is shown as an information processor 1000 to exemplify the hardware configuration thereof. Although a general configuration will be described below of an information processor typified by a computer, the minimum necessary configuration may be selected in accordance with the environment, as a matter of course.

The information processor 1000 includes a CPU (central processing unit) 1010, a bus line 1005, a communication I/F 1040, a main memory 1050, a BIOS (basic input output system) 1060, a parallel port 1080, a USB port 1090, a graphic controller 1020, a VRAM 1024, an audio processor 1030, an I/O controller 1070, and input devices 1100 such as a keyboard, a mouse adapter and the like. Storage means such as a flexible disk (FD) drive 1072, a hard disk 1074, an optical disk drive 1076, and a semiconductor memory 1078 are connectable to the I/O controller 1070.

A display 1022 is connected to the graphic controller 1020. An amplifier circuit 1032 and a speaker 1034 are connected to the audio processor 1030.

The BIOS 1060 stores therein a boot program which the CPU 1010 executes at the startup time of the information processor 1000, programs dependent on hardware of the information processor 1000, and the like. The FD drive 1072 reads a program or data from a flexible disk 1071, and provides it to the main memory 1050 or the hard disk 1074 via the I/O controller 1070.

As the optical disk drive 1076, a DVD-ROM drive, a CD-ROM drive, a DVD-RAM drive, a BD (blu-ray disc) drive, and the like may be used, for example. In each case, an optical disk 1077 corresponding to each drive needs to be used. The optical disk drive 1076 reads a program or data from the optical disk 1077, and may provide it to the main memory 1050 or the hard disk 1074 via the I/O controller 1070.

A computer program to be provided to the information processor 1000 is provided by a user while being stored in a recording medium such as a flexible disk 1071, an optical disk 1077, or a memory card. This computer program is read from the recording medium via the I/O controller 1070 or downloaded via the communication I/F 1040 to be installed to the information processor 1000 and be executed. The operation which the computer program causes the information processor to carry out is the same as that in the system described above, and thus the description thereof is omitted.

The aforementioned computer program may be stored in an external storage medium. Besides the flexible disk 1071, the optical disk 1077, or the memory card, a magneto-optic recording medium such as an MD or a tape medium may be used as the storage medium. In addition, a storage device such as a hard disk or an optical disk library provided in a server system connected to a dedicated communication line or the Internet may be used as a recording medium, and the computer program may be provided to the information processor 1000 via the communication line.

The above example has mainly been described in relation to the information processor 1000. However, the same functions as the above-described information processor can be achieved by installing to a computer a program having the described functions of the information processor, and causing the computer to operate as an information processor. Accordingly, the information processor described as an embodiment of the present invention can be implemented as a method or a computer program thereof.

The processor can be implemented as hardware, software, or a combination of hardware and software. A typical example of the implementation by a combination of hardware and software is implementation as a computer system including a predetermined program. In this case, the predetermined program is loaded to the computer system and executed, so that the program can cause the computer system to execute the processing according to the invention. This program is configured of an instruction set which can be expressed in an arbitrary language, code, or expression. In accordance with such an instruction set, the system can directly execute specific functions, or can execute the specific functions after either/both (1) converting the language, code, or expression into another one, or/and (2) copying to another medium. It goes without saying that the invention includes within its scope not only this program itself but also program products including a medium in which the program is recorded. The program for executing the functions of the invention may be stored in any computer readable medium such as a flexible disk, an MO, a CD-ROM, a DVD, a hard disk device, a ROM, a RAM, an M-RAM (magnetoresistive RAM), and a flash memory. So as to be storable in the computer readable medium, the program may be downloaded from another computer system connected by a communication line, or may be copied from another medium. In addition, the program may be compressed or divided into multiple pieces to be stored in one or multiple recording media.

Hereinabove, the present invention has been described according to the embodiment. However, the invention is not limited to the above embodiment. Moreover, the effect described in the embodiment of the invention only describes the most preferable effect of the invention, and the effect of the invention is not limited to that described in the embodiment of the invention.

What is claimed is:

1. A method to accelerate address translation from a virtual address into a physical address by use of a computer having a processing device, the method comprising the steps of:

mapping a virtual memory area with a large page, the virtual memory area including a plurality of virtual pages satisfying a predetermined condition and being handled in units of pages, the large page having a larger area than each of the virtual pages; and under a condition in which one of the virtual pages mapped with and included in the large page has a first memory protection attribute different from and more restrictive than a second memory protection attribute of another virtual page mapped with and included in the large page, setting physical memory protection information for a physical page corresponding to the one virtual page having the first and more restrictive memory protection attribute, wherein the physical memory protection information comprises at least one of an access control bit and a fetch protection bit in a storage key associated with the physical page, for protecting the physical page corresponding to the one virtual page having the first memory protection attribute.

2. The method according to claim 1, wherein the predetermined condition is that any of physical pages respectively corresponding to the plurality of virtual pages to be mapped with the large page does not correspond to any other virtual page.

3. The method according to claim 1, wherein the predetermined condition is that a ratio of an amount of virtual pages each having no corresponding physical page with respect to an amount of the plurality of virtual pages to be mapped with the large page is lower than a certain value, wherein the certain value is one of a predefined threshold or an amount of available free memory space.

4. The method according to claim 1, wherein the predetermined condition is that the virtual pages are determined to be mapped with the large page based on a usage history of large pages.

5. The method according to claim 1 comprising the step of, in response to the presence of the virtual page that needs to be newly mapped, determining whether or not the predetermined condition is satisfied.

6. The method according to claim 2 comprising the step of, in a case where the other virtual page corresponding to the physical page is mapped with the large page, changing the large page back to the virtual page in the unit of page.

7. The method according to claim 1, wherein the computer stores an application executable on another computer and an emulator of the application.

8. A non-transitory computer readable storage medium storing computer executable code for causing a computer with a processing device to perform a method to accelerate address translation from a virtual address into a physical address, the code comprising:

determination component for determining whether or not a predetermined condition is satisfied in response to the presence of a virtual page that needs to be newly mapped;

large page mapping component for, when the previous determination component determines that the predetermined condition is satisfied, mapping a virtual memory area with a large page, the virtual memory area including a plurality of virtual pages being handled in units of pages, the large page having a larger area than each of the virtual pages; and protection setting component for, under a condition in which one of the virtual pages mapped with and included in the large page has a first memory protection attribute different from and more restrictive than a second memory protection attribute of another virtual page mapped with and included in the large page, setting physical memory protection information for a physical page corresponding to the one virtual page having the first and more restrictive memory protection attribute, wherein the physical memory protection information comprises at least one of an access control bit and a fetch protection bit in a storage key associated with the physical page, for protecting the physical page corresponding to the one virtual page having the first memory protection attribute.

* * * * *